(12) United States Patent
Firl et al.

(10) Patent No.: US 8,897,997 B2
(45) Date of Patent: Nov. 25, 2014

(54) METHOD AND APPARATUS FOR THE CLASSIFICATION OF DATA

(75) Inventors: Jonas Firl, Wiesbaden (DE); Hagen Stuebing, Buedingen (DE)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 13/467,109

(22) Filed: May 9, 2012

(65) Prior Publication Data
US 2012/0290198 A1 Nov. 15, 2012

(30) Foreign Application Priority Data
May 12, 2011 (DE) .......................... 10 2011 101 359

(51) Int. Cl.
*G08G 1/123* (2006.01)
*G06F 17/10* (2006.01)
(Continued)

(52) U.S. Cl.
CPC ................ *G08G 1/07* (2013.01); *G08G 1/0112* (2013.01); *G08G 1/166* (2013.01);
(Continued)

(58) Field of Classification Search
CPC .......... B60R 1/00; B60R 16/02; B60R 1/002; B60R 1/12; B60R 21/0132; B60R 22/105; B62D 13/06; B62D 15/027; B62D 15/0285; G01R 31/006; G08G 1/0965; G08G 1/166; G08G 1/0967; G08G 1/0962; G08G 1/20; G08G 5/04; G08G 1/161; G08G 1/164; G01C 21/00; G01C 21/36; G01C 21/26; G01C 21/34; G06F 12/02; G06F 17/00; G06F 7/00; G06F 19/00; B60W 40/06; B60W 10/06; B60W 10/18; B60W 30/09
USPC .......... 701/29, 210, 213, 27, 117, 209, 2, 33, 701/50, 201, 414, 36, 45, 22, 70, 29.3, 31.5, 701/49, 96, 23, 24, 102, 118, 110; 455/426.1; 370/338; 463/1; 711/154; 340/989, 466, 474, 905, 870; 343/703, 343/894

See application file for complete search history.

(56) References Cited

U.S. PATENT DOCUMENTS 8,068,981 B2 * 11/2011 Liberto et al. ................ 701/414
(Continued)

FOREIGN PATENT DOCUMENTS

| DE | 102006057276 A1 | 6/2008 |
| DE | 102007014649 A1 | 10/2008 |
| DE | 102010002092 A1 | 12/2010 |

OTHER PUBLICATIONS

Han-Shue Tan and Jihua Huang, Member, IEEE, DGPS-Based Vehicle-to-Vehicle Cooperative Collision Warning: Engineering Feasibility Viewpoints, IEEE Transactions on Intelligent Transportation Systems, vol. 7, No. 4, Dec. 2006, p. 415-428.*

(Continued)

*Primary Examiner* — Calvin Cheung
*Assistant Examiner* — Luis A Martinez Borrero
(74) *Attorney, Agent, or Firm* — Ingrassia Fisher & Lorenz, P.C.

(57) ABSTRACT

A method for the classification of data includes receiving a first message that is a vehicle-to-vehicle or a vehicle-to-infrastructure message. The first message includes first mobility data of a vehicle. An expected route of the vehicle is determined based on the first mobility data. A second message that is a vehicle-to-vehicle or a vehicle-to-infrastructure message is received. The second message includes second mobility data of the vehicle. An actual route of the vehicle is determined based on the second mobility data. Whether the expected route deviates from the actual route by at least a predetermined threshold value is determined. If the expected route deviates from the actual route by at least the predetermined threshold value, a type of momentary driving maneuver of the vehicle is determined and the first mobility data and the second mobility data are classified on the basis of the type of momentary driving maneuver.

10 Claims, 10 Drawing Sheets

(51) Int. Cl.
*G08G 1/01* (2006.01)
*G08G 1/16* (2006.01)
*G08G 1/07* (2006.01)

(52) U.S. Cl.
CPC ............ *G08G 1/0145* (2013.01); *G08G 1/0133* (2013.01); *G08G 1/163* (2013.01)
USPC ............ 701/117; 701/301; 701/118; 701/23; 701/24

(56) References Cited

U.S. PATENT DOCUMENTS

| | | | |
|---|---|---|---|
| 8,140,210 B2 | 3/2012 | Randler et al. | |
| 2004/0117113 A1* | 6/2004 | Friedrichs et al. | 701/210 |
| 2005/0060069 A1* | 3/2005 | Breed et al. | 701/29 |
| 2005/0102098 A1* | 5/2005 | Montealegre et al. | 701/209 |
| 2007/0005245 A1* | 1/2007 | Ellis | 701/213 |
| 2007/0080829 A1* | 4/2007 | Biesinger et al. | 340/988 |
| 2007/0179709 A1* | 8/2007 | Doyle | 701/209 |
| 2008/0024284 A1* | 1/2008 | Baratoff et al. | 340/435 |
| 2008/0027639 A1* | 1/2008 | Tryon | 701/209 |
| 2008/0161987 A1* | 7/2008 | Breed | 701/27 |
| 2008/0312832 A1 | 12/2008 | Greene et al. | |
| 2010/0023245 A1* | 1/2010 | Huang et al. | 701/117 |
| 2010/0049976 A1 | 2/2010 | Karnik | |
| 2010/0152950 A1* | 6/2010 | Chin et al. | 701/29 |
| 2010/0254346 A1* | 10/2010 | Jain et al. | 370/331 |
| 2010/0256903 A1* | 10/2010 | Johnson | 701/209 |
| 2010/0267379 A1* | 10/2010 | Stahlin et al. | 455/426.1 |
| 2010/0284384 A1* | 11/2010 | Stahlin et al. | 370/338 |
| 2010/0303048 A1* | 12/2010 | Stahlin et al. | 370/338 |
| 2010/0317420 A1* | 12/2010 | Hoffberg | 463/1 |
| 2011/0029233 A1* | 2/2011 | Carpenter | 701/202 |
| 2011/0047338 A1* | 2/2011 | Stahlin et al. | 711/154 |
| 2011/0066304 A1* | 3/2011 | Taylor | 701/2 |
| 2011/0098877 A1* | 4/2011 | Stahlin et al. | 701/33 |
| 2011/0112730 A1* | 5/2011 | Rekow | 701/50 |
| 2011/0112908 A1* | 5/2011 | Rowley et al. | 705/14.64 |
| 2011/0130964 A1* | 6/2011 | Kitagawa et al. | 701/301 |
| 2011/0190972 A1* | 8/2011 | Timmons et al. | 701/29 |
| 2011/0202271 A1* | 8/2011 | Kruithof | 701/201 |
| 2011/0307139 A1* | 12/2011 | Caminiti et al. | 701/29 |
| 2011/0310733 A1* | 12/2011 | Tzamaloukas et al. | 370/230 |
| 2011/0313663 A1* | 12/2011 | Kellum et al. | 701/300 |
| 2012/0010762 A1* | 1/2012 | Asano | 701/1 |
| 2012/0095641 A1* | 4/2012 | Merk | 701/28 |
| 2012/0139761 A1* | 6/2012 | Stahlin et al. | 340/989 |
| 2012/0173530 A1* | 7/2012 | Kurciska et al. | 707/738 |
| 2013/0282277 A1* | 10/2013 | Rubin et al. | 701/517 |
| 2013/0293394 A1* | 11/2013 | Rubin et al. | 340/902 |

OTHER PUBLICATIONS

German Patent Office, German Search Report for Application No. 102011101359.1, dated Apr. 24, 2011.

\* cited by examiner

METHOD AND APPARATUS FOR THE CLASSIFICATION OF DATA

CROSS-REFERENCE TO RELATED APPLICATION

This application claims priority to German Patent Application No. 10 2011 101 359.1, filed May 12, 2011, which is incorporated herein by reference in its entirety.

TECHNICAL FIELD

The technical field generally relates to a method and apparatus for the classification of data, a computer program product and a computer-readable medium.

BACKGROUND

In DE 10 2010 002 092 A1, data processing has been disclosed for vehicle-to-X messages. Data processing is carried out before pre-processed data is handed over to the corresponding applications. During preprocessing data reduction may be performed. It is also possible to perform a plausibility check on the data and, if required, correct it, before this is passed to a security application, for example. In particular the data can be split into various data classes that are handled in varying ways.

Accordingly, it is desirable to provide a method and an apparatus for the classification of data, a computer program product, and a computer-readable medium that permit more enhanced data verification is provided. Furthermore, other desirable features and characteristics will become apparent from the subsequent detailed description and the appended claims, taken in conjunction with the accompanying drawings and this background.

SUMMARY

In accordance with an exemplary embodiment, a method for the classification of data is provided. The method includes receiving a first message. The first message is a vehicle-to-vehicle message or a vehicle-to-infrastructure message. The first message includes first mobility data of at least one vehicle. Furthermore the expected route of the vehicle is determined based on at least the first mobility data. Additionally a second message is received. The second message is a vehicle-to-vehicle message or a vehicle-to-infrastructure message. The second message includes second mobility data of the at least one vehicle. In addition an actual route of the vehicle is determined based on the second mobility data. Furthermore it is determined as to whether the determined expected route deviates from the actual route at least by a predetermined threshold value. If it determined that the determined expected route deviates from the actual route at least by the determined threshold value, a type of momentary driving maneuver of the vehicle is determined, and a classification is carried out of the first mobility data and the second mobility data based on the determined type of momentary driving maneuver.

The method permits more enhanced data verification. This is done by determining a type of momentary driving maneuver of the vehicle and by classifying the first mobility data and the second mobility data based on the determined type of driving maneuver in case the expected route deviates from the actual route by the predetermined threshold value. For highly dynamic driving maneuvers of the vehicle, it is not sufficiently precise to merely determine the expected route of the vehicle, i.e. the predicted route, based on the received mobility data. In individual cases this may lead to a false evaluation of the received message. By contrast the method contemplated herein allows recognizing also highly dynamic driving situations and evaluating them correctly.

The first and/or second mobility data includes, for example, a momentary position, a momentary speed and/or a momentary direction of the vehicle. Thus, the present data is utilized for determining the driving maneuver, whereby the number of required components for the method can be kept to a minimum.

In an exemplary embodiment, determining the type of momentary driving maneuver of the vehicle is performed based on a Hidden Markov model. This kind of stochastic model is especially suitable for a corresponding recognition of the driving maneuver.

In a further embodiment, determining the expected route of the vehicle is performed based on a Kalman filter method. A method of this kind is especially suitable for use in real-time systems, in particular for predicting the route of moving objects.

Classification of the first mobility data and the second mobility data preferably includes carrying out adaptation of the predetermined threshold value based on the determined type of momentary driving maneuver. Furthermore it is determined as to whether the determined expected route deviates from the actual route by the adapted threshold value.

If it is determined that the determined expected route deviates from the actual route by at least the adapted threshold value, the first mobility data and the second mobility data are classified as being erroneous, in accordance with an exemplary embodiment. If, on the other hand, it is determined that the determined expected route does not deviate from the actual route by at least the adapted threshold value, the first mobility data and the second mobility data are classified as being free from errors.

Furthermore, if it is determined that the determined expected route does not deviate from the actual route by at least the adapted threshold value, adaptation of a Kalman Gain value may be carried out.

In this regard, an improved classification or verification of the received mobility data is permitted. In addition it is made possible to effect a further improved prediction through adaptation of the Kalman gain value.

Determining the actual route of the vehicle and/or determining the type of momentary driving maneuver of the vehicle may, in addition, be carried out based on data determined by one or more sensors, wherein the sensor is an electromagnetic sensor, in particular a runtime-based sensor, for example, a Radar sensor or a Lidar sensor, an acoustic sensor, in particular an ultra-sound sensor, or an optical camera. This allows a data fusion or mutual plausibility check of the respective data to be carried out, thus improving the process of determining the mentioned parameters even further.

The first message and/or the second message preferably are part of the periodic sending of messages. Such periodically sent messages, also described as CAMs (cooperative awareness messages), typically already include mobility data of the respective vehicle, for example position, speed and direction of the vehicle, wherein this type of message is particularly suitable for predicting the route. The messages are sent, for example, at intervals of one second (1 s), wherein for a change in speed of the respective vehicle the interval may be reduced to a maximum of 100 milliseconds (100 ms).

In a further embodiment of the method a plausibility check is carried out on the first mobility data at least after receiving the first message. If the first mobility data are found to be plausible, determination of the expected route, determination of the actual route and determination as to whether the determined expected route deviates from the actual route by at least the predetermined threshold value are then carried out. This leads to a reduction of data and/or of calculations due to the fact that mobility data determined not to be plausible are not used for performing the steps. For example it may be determined whether a vehicle speed contained in the mobility data exceeds a predetermined maximum value. Furthermore it may be determined whether a communicated position of the vehicle lies outside the communication range of the receiving device which receives the messages.

In addition a plausibility check may be carried out on further data received in at least the first message. For example it may be determined whether a time stamp contained in the message does not match the momentary time, since, for example, it already lies too far in the past or points to a future point in time. Furthermore, if several messages are received, a plausibility check may be carried out based on the frequency of the sent messages.

In a further embodiment, in which at least the first message includes an identifier of the transmitting device sending the message, determination of the expected route, determination of the actual route and determination as to whether the determined expected route deviates from the actual route by at least the predetermined threshold value, is carried out, if at least one further message has already been received from the transmitting device. In this embodiment it is therefore determined, based on an identifier of the transmitter, whether the transmitting device is a known transmitting devices and/or a transmitting device deemed to be trustworthy.

The classified first mobility data and/or the classified second mobility data is preferably communicated to at least one driver assistance system and/or at least one infrastructure facility. For example, the mobility data is communicated to a collision warning system and/or an emergency brake assistant and/or an intersection assistant. Furthermore the classified mobility data may be communicated to a roadside infrastructure facility which is in operative connection with traffic lights, also described as an RSU (road side unit). This allows the receivers to have mobility data at their disposal, which have been classified and/or verified by means of the method to a further improved extent.

An apparatus for the classification of data also is provided in accordance with another exemplary embodiment. The apparatus comprises a receiving device that is arranged to receive a message that is a vehicle-to-vehicle message or a vehicle-to-infrastructure message. The message includes mobility data of at least one vehicle. Further, the apparatus comprises a first determination device arranged for determining an expected route of the vehicle based on at least the mobility data. In addition the apparatus comprises a second determination device arranged for determining an actual route of the vehicle based on at least the mobility data. Further the apparatus comprises a third determination device arranged for determining as to whether the determined expected route deviates from the actual route by a predetermined threshold value. Furthermore the apparatus comprises a fourth determination device arranged for determining a type of momentary driving maneuver of at least one vehicle in case it is determined that the determined route deviates from the actual route by at least the predetermined threshold value. Furthermore the apparatus comprises a classification device arranged for classifying at least the mobility data based on the determined type of momentary driving maneuver.

In accordance with another exemplary embodiment, a computer program product is provided. The computer program, if executed on a computer unit of an apparatus for the classification of data, instructs the computer unit to receive a first message that is either a vehicle-to-vehicle message or a vehicle-to-infrastructure message. The first message includes first mobility data of at least one vehicle. In addition the computer unit is instructed to determine an expected route of the vehicle based at least on the first mobility data. Furthermore the computer unit is instructed to receive a second message that is either a vehicle-to-vehicle message or a vehicle-to-infrastructure message. The second message includes second mobility data of the vehicle. Further the computer unit is instructed to determine an actual route of the vehicle based at least on the second mobility data. Furthermore the computer unit is instructed to determine as to whether the determined expected route deviates from the actual route by at least a predetermined threshold value. In case it is determined that the determined expected route deviates from the actual route by least the predetermined threshold value, the computer unit is instructed to determine a type of momentary driving maneuver of the vehicle and to classify the first mobility data and the second mobility data on the basis of the determined type of momentary driving maneuver.

A computer-readable medium on which a computer program product according to the described embodiment is stored is further provided.

In the above mentioned embodiments the vehicle is, for example, a motor vehicle, in particular a passenger car or a lorry.

BRIEF DESCRIPTION OF THE DRAWINGS

The various exemplary embodiments will hereinafter be described in conjunction with the following drawing figures, wherein like numerals denote like elements, and wherein.

DETAILED DESCRIPTION

The following detailed description is merely exemplary in nature and is not intended to limit the exemplary embodiments or the application and uses thereof. Furthermore, there is no intention to be bound by any theory presented in the preceding background or the following detailed description.

Figure 1:
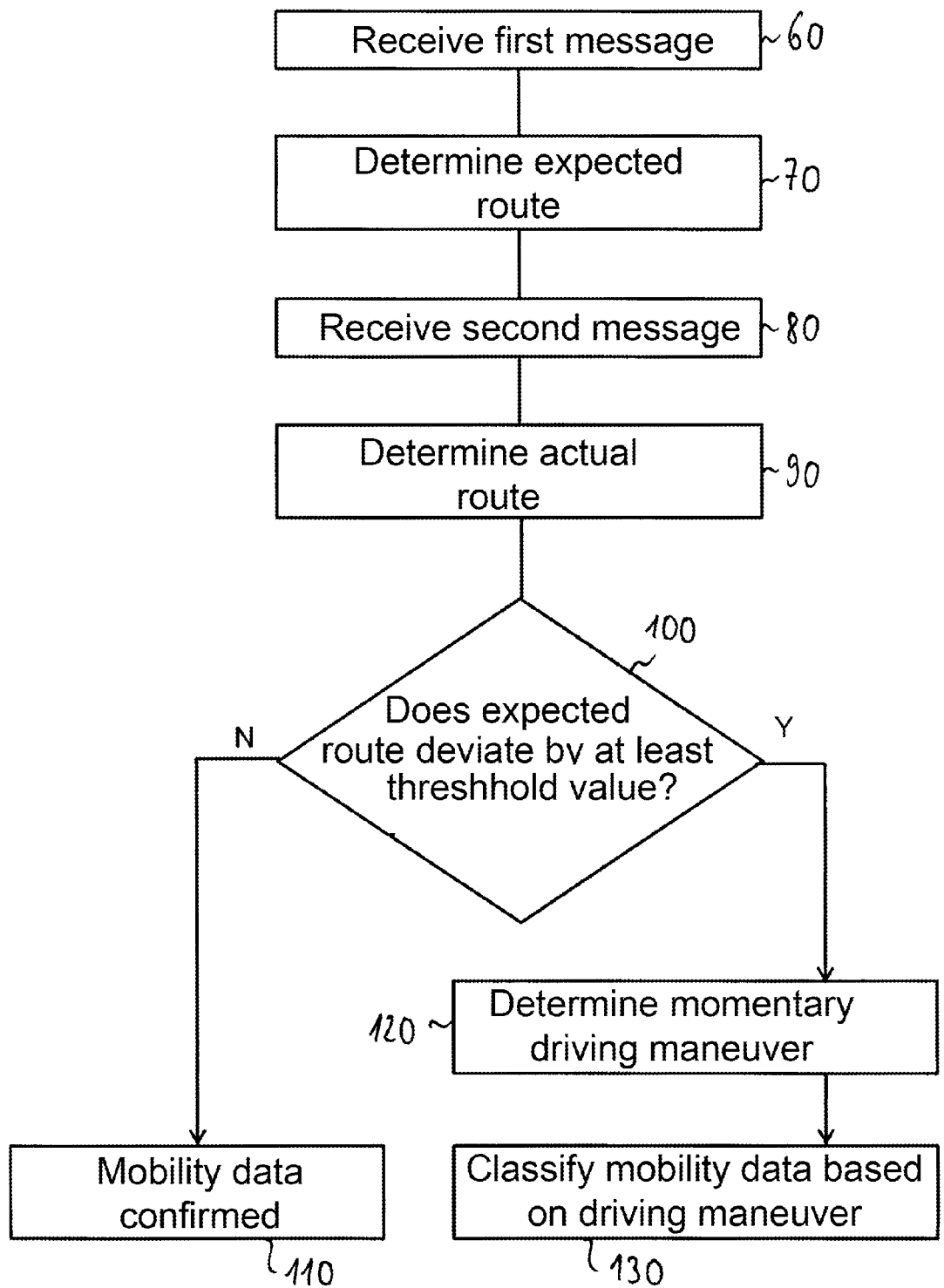
FIG. 1 is a flow diagram of a method for the classification of data according to an exemplary embodiment.

FIG. 1 is a flow diagram of a method for the classification of data according to an exemplary embodiment. The method includes receiving a first message (step 60). The first message is a vehicle-to-vehicle message or a vehicle-to-infrastructure message. The first message is also called a car-to-car (C2C) or car-to-infrastructure (C2I) message or, in summary, C2X messages. The first message contains first mobility data of at least one vehicle, for example, position, speed and, direction of the vehicle. The vehicle is, for example, a passenger car.

An expected route of the vehicle based at least on the first mobility data is determined (step 70). Determining the expected route of the vehicle takes place preferably based on a Kalman filter method. For example, determining the expected route may include determining expected mobility data of the vehicle.

Next, a second message is received (step 80). The second message is a vehicle-to-vehicle message or a vehicle-to-infrastructure message. The second message includes second mobility data of the vehicle which were determined or provided at a later point in time than the first mobility data.

An actual route of the vehicle is determined based on at least the second mobility data (step 90). In step 100 it is determined, whether the determined expected route deviates from the determined actual route by at least a predetermined threshold value. For example it may be determined, in case determination of the expected route includes determination of expected mobility data of the vehicle, whether this determined expected mobility data deviates from the received second mobility data by at least one expected threshold value.

If the determined expected route does not deviate from the actual route by at least the predetermined threshold value, at least the first mobility data and second mobility data are classified as being free from errors (step 110). If, however, the determined expected route deviates from the actual route by a predetermined threshold value, determination of a type of momentary driving maneuver of the vehicle is performed. Determination of a type of momentary driving maneuver is preferably carried out based on at least the first mobility data and the second mobility data. In particular determination of the type of momentary driving maneuver is carried out based on a Hidden Markov model. Further determination of the type of momentary driving maneuver may be carried based on data determined by one or more sensors, wherein the sensor is an electromagnetic sensor, an acoustic sensor, or an optical camera. Further in step 130 classification of the first mobility data and the second mobility data is carried out based on the determined type of momentary driving maneuver.

Figure 2:
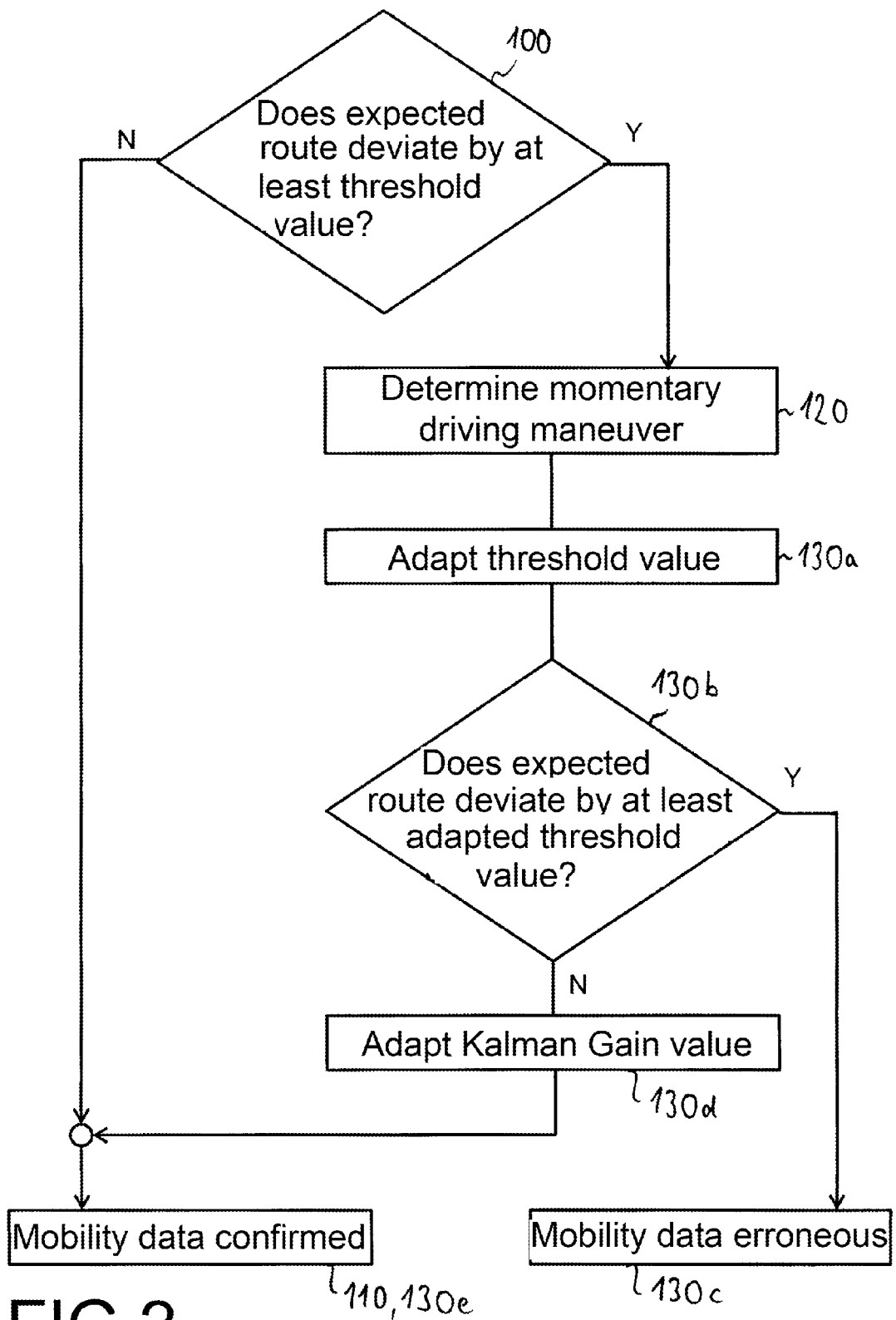
FIG. 2 is a flow diagram of a method for the classification of data according to another exemplary embodiment.

FIG. 2 is a flow diagram of a method for the classification of data according to another embodiment. In this embodiment, again a first message that is a vehicle-to-vehicle message or a vehicle-to-infrastructure message is received, an expected route is determined, a second message is received and an actual route is determined, corresponding to steps 60, 70, 80 and 90 of the first embodiment shown in FIG. 1, respectively. For brevity, these steps are not shown again in FIG. 2.

In step 100 it is again determined whether the determined expected route deviates from the determined actual route by at least the predetermined threshold value. If the determined expected route does not deviate from the actual route by at least the predetermined threshold value, the first mobility data and the second mobility data are classified as being free from errors (step 110), which means that the mobility data is confirmed. If, however, the determined expected route deviates from the actual route by at least the predetermined threshold value, determination of a type of momentary driving maneuver of the vehicle is carried out (step 120).

Furthermore, the predetermined threshold value is adapted based on the determined type of momentary driving maneuver (step 130a). It then is determined whether the determined expected route deviates from the actual route by at least the adapted threshold value (step 130b). If the determined expected route deviates from the actual route at least by the adapted threshold value, that is, if the deviation between the expected and actual route is at least as great as the adapted threshold value, the first mobility data and the second mobility data are classified as being erroneous (step 130c). If, however, it is determined that the determined expected route does not deviate from the actual route by at least the adapted threshold value, a Kalman Gain value is adapted (step 130d). In addition, classification of the first mobility data and the second mobility data as being free from errors is carried out (step 130e).

Figure 3:
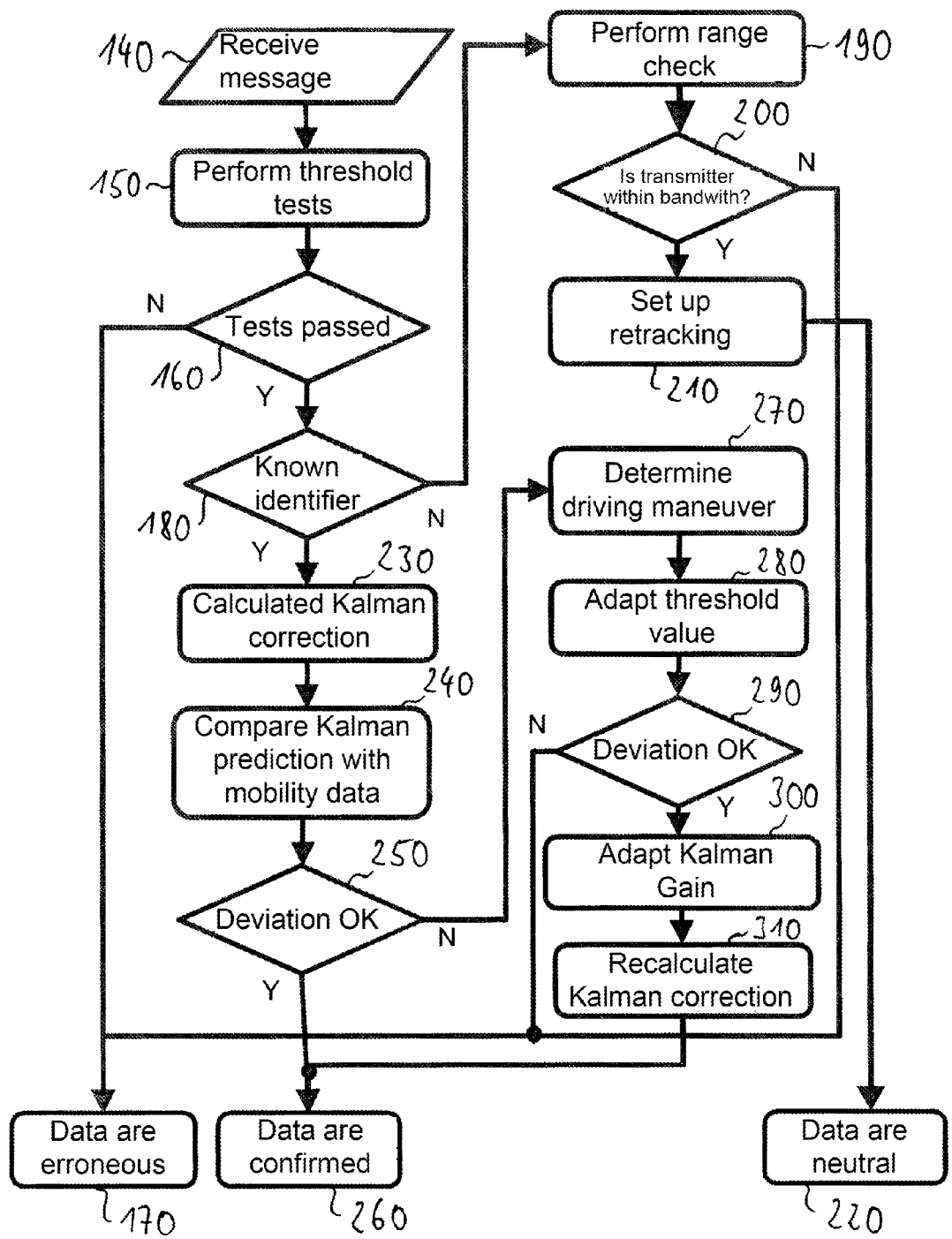
FIG. 3 is a flow diagram of a method for the classification of data according to a further embodiment.

FIG. 3 is a flow diagram of a method for the classification of data according to a further embodiment. Again a message is received. The message is a vehicle-to-vehicle message or a vehicle-to-infrastructure message. The message includes mobility data of at least one vehicle as well as a transmitter or vehicle identifier, also called an ID (step 140).

A plausibility check of the received message, in particular of the received mobility data, is carried out (step 150). To this end several threshold value tests are carried out in the embodiment shown. A threshold value verification of this kind makes it possible to prevent an already running mobility prediction from being impaired by inconsistent data. In the embodiment shown, mobility data exceeding special physical limit values or threshold values is filtered out. For example, due to existing physical conditions, vehicles will drive at a maximum speed, even on motorways. Furthermore a message comprising a transmitter position which lies outside the communication range of the receiving device, such as a receiving vehicle, may be considered as not being trustworthy. In order to additionally draw the received mobility data into the context of the movement of one's own vehicle, also called the host vehicle, one's own positioning data such as GPS positioning information, speed and direction of one's own vehicle are regularly updated.

Furthermore a check is carried out in the shown embodiment of a time stamp contained in a received message, in order to filter out messages the time stamp of which either has already expired or is dated as being a future point in time. A further threshold-value test monitors the repetition frequency of the received messages, for example the repetition rate of CAM messages. In order to prevent so-called denial-of-service attacks, CAM messages in particular, which are sent at a repetition frequency which exceeds a predetermined threshold value, for example a threshold value fixed by the ETSI (European Telecommunications Standards Institute), are discarded.

The tests represent very basic checks, and in one embodiment are completed successfully, in order to continue with verification or classification of the data. If one of the tests is not successfully passed, the entire message will be classified as erroneous. To this end it is determined in step 160 whether the tests were passed and, if this is not the case, the message is marked as erroneous in step 170. If, however, the tests were passed, it is determined whether the transmitter-ID or vehicle-ID is already known, that is, whether at least one further message has already been received by the same transmitting device (step 180).

If the respective ID is not known, a range check is carried out (step 190). The shown embodiment is based on the consideration that with a new transmitter or a new vehicle this generally appears initially within in the area of the current communication range limit. For this reason a tolerance bandwidth is fixed in the shown embodiment. This is given by an area extending between a maximum communication range "rmax" and a predetermined bandwidth "dB." Correspondingly only those messages will be marked as confirmed, which point to a vehicle which appears within the range rmax-dB to rmax.

However, starting vehicles may also appear suddenly in the vicinity of one's own vehicle. In order to exclude such vehicles from the bandwidth test or accepted-range test, a minimum speed is taken into consideration.

Next, it is determined whether the newly appearing vehicle or the newly added transmitter is within the predetermined bandwidth (step 200). If this not the case, the message is classified as being erroneous (step 170). If the newly added transmitter, however, lies within the bandwidth a new tracking of the transmitter is instantiated (step 210). Furthermore the received message is marked as being neutral (step 220), which means that it is not possible to issue a reliable or meaningful statement regarding the message.

If it is determined that the transmitter-ID or vehicle-ID is known (step 180), the so-called tracker already allocated to the vehicle is used to compare the received mobility data by means of a used mobility model. Based on a time stamp contained in the message an expected route is forecast in the form of expected mobility data. This is done by triggering the so-called Kalman prediction phase, which will now be explained in more detail. During a Kalman filter correction phase the deviation between the expected state and the received mobility data is calculated (step 230).

The Kalman prediction is compared with the received mobility data (step 240). It is determined whether the deviation between the values corresponds to at least a predetermined threshold value (step 250). The predetermined threshold value in the shown embodiment is fixed as the maximum deviation in x- and y-direction. In the shown embodiment starting or initial values are based on GPS errors which, for example, lie within a range of three to five meters. If the deviation does not exceed the predetermined threshold value the received message is classified as free from errors (step 260) and is thus confirmed.

If, however, the deviation exceeds the predetermined threshold value a type of momentary driving maneuver of the vehicle is determined (step 270). This involves evaluating the driving or traffic situations within the communication range thereby providing an estimate. If it is determined that the vehicle momentarily performs a highly dynamic driving maneuver the threshold value predetermined in step 280 is adapted accordingly, i.e. it is increased. Next, it is determined whether the determined expected route deviates from the actual route by at least the adapted threshold value (step 290). If the determined deviation also exceeds the adapted threshold value, the message is classified as being very probably erroneous. This is shown in step 170.

If, however, the threshold value test is passed an improved prediction is performed. To this end the Kalman Gain value which represents a weighting between measurement and prediction is adapted (step 300) in such a way as to apply a higher weighting to the measured data relative to the predicted data.

Following this adaptation, the Kalman correction is recalculated (step 310). In addition the received message is classified as being free from errors (step 260).

The shown embodiment thus permits making messages plausible, in particular in car-to-car communications, based on a comparison between received message and predicted data which is calculated on the basis of previously received messages. This is based on a consideration that prediction procedures based merely on Kalman filtering are not sufficiently precise in the case of highly dynamic driving maneuvers, for example in a case where an abrupt overtaking maneuver is performed. This may lead to a false evaluation of received messages. The method contemplated herein additionally utilizes procedures that have the ability to recognize traffic situations. In this way it is possible to recognize and reliably evaluate also highly dynamic situations.

This involves using a plausibility check that initially examines physical threshold values and then forwards data to a Kalman module. This predicts mobility data based on previously obtained data, a selected system model and the GPS errors contained in C2C messages. The difference between predicted and obtained mobility data is threshold-value-filtered and the obtained data may be marked as implausible. The reliability of the evaluation is limited by the prediction quality of the Kalman filter. The Kalman filter may contain errors in highly dynamic situations. In the method according to the various embodiments therefore an additional downstream plausibility check is performed. If the message is marked as implausible a situation-dependent threshold value adaptation is performed. This is based on a probabilistic maneuver recognition with the aid of Hidden Markov models that calculate probabilities from obtained mobility data for individual maneuvers, such as overtaking maneuvers or following drives. Thus it is possible to additionally check individual mobility data for its plausibility, which is realized by adapting the corresponding threshold value. By performing a new check on the arrived message, a reappraisal of the same may be undertaken, if required. In order to correct the current state in hindsight, the Kalman Gain value is adapted and the prediction step performed once more.

The method according to the shown embodiment thus permits an improved plausibility check, in particular on incoming C2C messages. Apart from uniform movements also highly dynamic, abrupt operations such as quickly performed lane-changing operations can be reproduced. In C2C communication this allows a more reliable allocation of messages and/or a better detection of irregularities within message sequences. As a result improvements can be made to the safety in communication networks. In addition the method may be used in further tracking applications.

Figure 4:
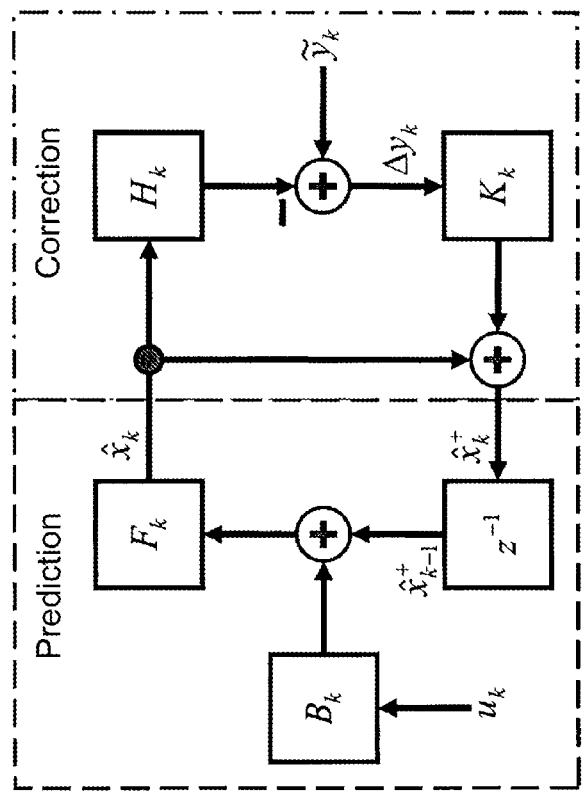
FIG. 4 is a diagram of a method for predicting a route.

FIG. 4 is a diagram of a method for predicting the driving route. In order to predict the state of a linear system a Kalman filter repeats two successive phases for each time-step k. The first phase is the prediction, wherein a prediction $\hat{x}_k$ of the system state is performed by multiplying the last predicted state $\hat{x}_{k-1}^+$ with the state-transition-matrix $F_k$. The state-transition-matrix is the mathematical representation of the underlying system model. Thus:

$$\hat{x}_k = F_k \hat{x}_{k-1}^+ \qquad (1)$$

In order to permit a more precise prediction, the Kalman filter offers the possibility of adding additional reference values $u_k$ by means of a reference matrix $B_k$ to the system state, before the state-transition-matrix is applied. In this way it is possible to take account of additional information which is not part of the system model. This results in:

$$\hat{x}_{k-1}^+ = \hat{x}_{k-1}^+ + B_k \cdot u_k \qquad (2)$$

In addition a prediction error $P_k$ based on the transition matrix, the last determined prediction error and the system-error-matrix $Q_k$ is determined. The system-error-matrix represents errors which are inherently present in the system model used. This results in:

$$P_k = F_k \cdot P_{k-1}^+ \cdot F_k^T + Q_k \qquad (3)$$

The prediction phase is followed by the correction phase. The predicted state is corrected by means of measurements, in order to arrive at a more accurate system state. To this end the difference $\Delta y_k$ between measured measurements $\tilde{y}_k$ and predicted measurements is calculated. Based on the momentary system state the predicted measurements are transformed to represent the system state by applying a measurement matrix $H_k$. The result is:

$$\Delta y_k = \tilde{y}_k - H_k \hat{x}_k \qquad (4)$$

In addition the Kalman Gain $K_k$ is determined based on the prediction error and taking measuring variances $R_k$ into account. This results in:

$$K_k = P_k \cdot H_k^T \cdot (H_k \cdot P_k \cdot H_k^T + R_k)^{-1} \quad (5)$$

The corrected system state $\hat{x}_k^+$ is provided by weighting the difference $\Delta y_k$ with the Kalman Gain and adding it to the system state. The matrix $K_k$ is a measure for the weighting, in case the corrected state is closer to the measurement and/or the prediction. This results in:

$$\hat{x}_k^+ = \hat{x}_k + K_k \cdot \Delta y_k \quad (6)$$

Furthermore the prediction error is corrected in order to provide a more accurate prediction error $P_k^+$. Thus:

$$P_k^+ = P_k - K_k \cdot H_k \cdot P_k \quad (7)$$

The corrected system state and the prediction error are used in the subsequent prediction phase at the point in time k+1.

FIG. 4 schematically shows the Kalman filter phases. Here $z^{-1}$ shows the time lag between step k−1 and step k.

In order to apply the Kalman filter method to route prediction and/or vehicle tracking, the received mobility data is transformed in the shown embodiment as follows. The position is convened into a so-called Universal Transverse Mercator (UTM) coordinate system, which forms a two-dimensional plane with an orthonormal base. UTM coordinates are given in meters as northwardly directed (y-axis) and eastwardly directed (x-axis) values.

Speed and direction are combined and converted to speed relative to each of these axes in meters per second (m/s).

The state vector of the Kalman filter thus consists of the position of the vehicle ($p_x$, $p_y$) and the speed ($v_x$, $v_y$) in the x-y plane. This results in:

$$\hat{x}_k = \begin{pmatrix} p_x \\ p_y \\ v_x \\ v_y \end{pmatrix} \quad (8)$$

A vehicle mobility model is used for the prediction of position and speed, which in the shown embodiment is based on an equation of linear movement. In this equation $\Delta t_k$ is the time difference at the time k−1, $p_k$ is the position, $v_k$ is the speed and $a_k$ is the acceleration, respectively, at the time k. This results in:

$$p_k = p_{k-1} + v_{k-1} \cdot \Delta t_k + a_{k-1} \cdot \frac{\Delta t_k^2}{2} \quad (9)$$

According to this equation and the shape of the selected system state the system-transition-matrix $F_k$ is a four-by-four-matrix of the form:

$$F_k = \begin{pmatrix} 1 & 0 & \Delta t_k & 0 \\ 0 & 1 & 0 & \Delta t_k \\ 0 & 0 & 1 & 0 \\ 0 & 0 & 0 & 1 \end{pmatrix} \quad (10)$$

In addition the acceleration in x and y direction is added to the system state as a reference factor $u_k$. Thus:

$$u_k = \begin{pmatrix} a_x \\ a_y \end{pmatrix} \quad (11)$$

Since the messages can be sent at variable intervals, for example between 100 ms and 1000 ms, $\Delta t_k$ in the shown embodiment cannot be assumed to be constant.

In the shown embodiment the information contained in the received C2X message is used as the measured input value $\tilde{y}_k$, which is utilized for correcting the prediction. The contained data for positioning, speed and direction are converted corresponding to the type of described system state when the messages are received. This results in:

$$\hat{y}_k = \begin{pmatrix} p_x \\ p_y \\ v_x \\ v_y \end{pmatrix} \quad (12)$$

Correspondingly the state and measuring vectors in the shown embodiment are of identical form, and the measuring matrix $H_k$ consists merely of the unit matrix, so that the equations (4), (5), and (7) can be significantly simplified by eliminating $H_k$.

Since the vehicle mobility prediction essentially depends upon the respective carriageway situation, the system-error-matrix $Q_k$ in the shown embodiment is selected dynamically according to the respective carriageway type. The measurement-variance-matrix $R_k$ is also selected dynamically based on the GPS accuracy data supplied in the respective messages.

Utilizing the above-mentioned adaptations and selected matrices the Kalman filter method can be used for vehicle tracking and/or for determining the expected route. The determination of the type of momentary driving maneuver is of particular importance to the method for classifying data. For it permits a more accurate prediction of the route of the respective traffic participants. In the shown embodiment the type of momentary driving maneuver is determined based on Hidden Markov models which will now be explained in more detail.

A Hidden Markov model (HMM) is a stochastic process for modeling dynamic systems using unknown (hidden) states. It is determined by:

- a set of hidden system states $X=(X_1, \ldots, X_N)$, wherein $q_t$ is the state at time t.
- a set of possible observations $Y=(Y_1, \ldots, Y_M)$, wherein $o_t$ is the observation at time t.
- a state-transition-matrix $A=\{a_{i,j}\}$, wherein i,j=1, ..., N, wherein $a_{i,j}=P(q_{t-1}=X_j|q_t=X_i)$.
- an observation-probability-distribution $B=\{b_j(k)\}$ in state j, wherein $b_j(k)=P(o_t=Y_k)|q_t=S_j)$, k=1, ..., M.
- an initial probability distribution $\pi=\{\pi_i\}$, wherein i=1, ..., N, with $\pi_i=P(q_1=X_i)$.

The assumption of a discrete set of observation symbols in actual applications is often imprecise or inappropriate, which is why typically so-called mixture models, typically so-called Gaussian mixture models, (GMMs), are used in order to spread the determination across a continuous observation space. This results in:

$$b_j(0) = \sum_{i=1}^{m} c_{j,i} N\left(0, \mu_{j,i} \sum\nolimits_{j,i}\right)$$

Two essential assumptions made by the HMM process may be directly derived from the definition for all i, j, t:

1. Markov Property:

$$P(q_{t+1}=X_j|q_t, \ldots, q_t)=P(q_{t+1}=X_j|q_t).$$

2. Time Invariance:

$$P(q_{t+1}=X_i|q_t=X_j)=\ldots=P(q_2=X_i|q_1=X_j).$$

In the following a Hidden Markov model is defined by $\lambda:=(A,B,\pi)$.

For Hidden Markov models this raises the following problems:

Evaluation problem: How can the probability $P(o|\lambda)$ be determined if the observation sequence $o=(o_1, \ldots, o_T)$ and the model parameters $\lambda=(A,B,\pi)$ are given? This problem is solved using the recursive forward procedure, wherein the forward variables are defined as:

$$a_t(i):=P(o_1, \ldots, o_t, q_t=X_i|\lambda)$$

Trainings problem: How can the model parameters $\lambda=(A,B,\pi)$ be adapted, if an observation sequence of o is given in order to maximize the probability $P(o|\lambda)$? To this end iterative algorithms are applied, typically the so-called EM algorithm, in particular the implementation by Baum-Welsh.

In order to determine a type of momentary driving maneuver the shown embodiment utilizes the approach of using a forward procedure. A HMM $\lambda i$ is used for each maneuver to be recognized and/or to be determined and characteristic data is selected as input data "o" in the form of relative speed, speed and acceleration between two traffic participants. In the shown embodiment a difference is made between three maneuvers between two vehicles: an overtaking maneuver, a following maneuver and a flanking maneuver.

There are two distinct stages:
Offline model training by means of an EM algorithm,
Online evaluation; for each trained model $\lambda_i$ the following is calculated:

$$P(o\mid\lambda_i)$$

$$P(\lambda_i\mid o) = \frac{P(o\mid\lambda_i)P(\lambda_i)}{P(o)}$$

(Bayes theorem), wherein P(o) may be set to 1 and the a-priori probability $P(\lambda_i)$ is fixed depending upon the carriageway type.

The states of the models correspond to the stages of the respective driving maneuver, as will be explained in detail in conjunction with FIG. 6A.

In the shown embodiment the input data o are provided by the messages obtained from the vehicle. The online evaluation step described above is used to determine the probability for a maneuver for the given observation sequence. Further details are explained in more detail in conjunction with the following figures.

Figure 5:
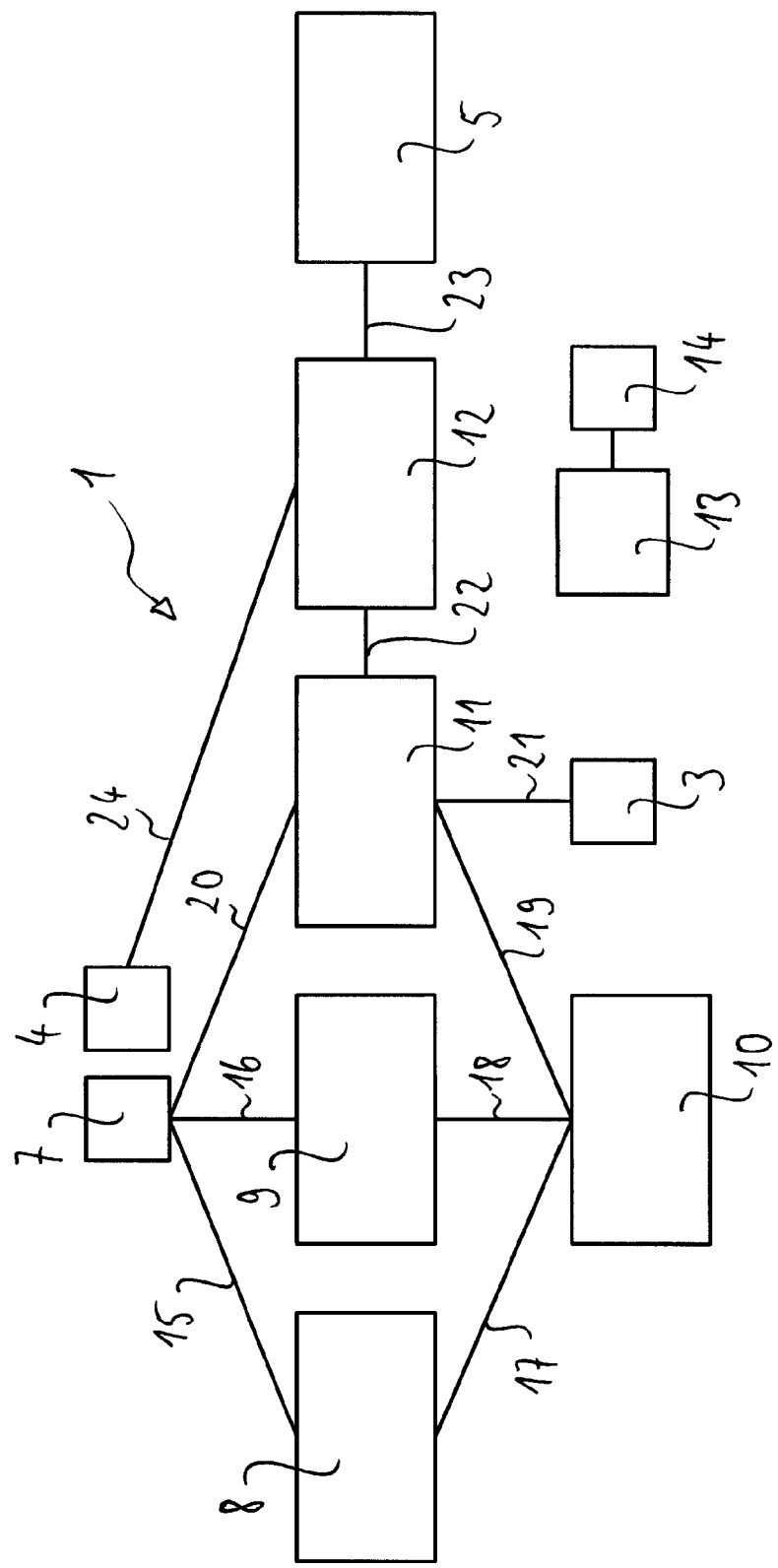
FIG. 5 shows an apparatus for the classification of data according to an embodiment of the application.

FIG. 5 shows an apparatus 1 for the classification of data according to an embodiment. Apparatus 1 comprises a receiving device 7 designed to receive a message that is a vehicle-to-vehicle message or a vehicle-to-infrastructure message. The message includes mobility data of at least one vehicle. In addition apparatus 1 comprises a first determination device 8 designed to determine an expected route of the vehicle based at least on the mobility data. To this end the determination device 8 is connected via a signal line 15 with the receiving device 7.

Furthermore apparatus 1 comprises a second determination device 9 designed to determine an actual route of the vehicle based on at least the mobility data. To this end the determination device 9 is connected via a signal line 16 with the receiving device 7.

Apparatus 1 further comprises a third determination device 10 designed to determine whether the determined expected route deviates from the actual route by at least a predetermined threshold value. To this end the determination device 10 is connected via a signal line 17 with the first determination device 8 and via a signal line 18 with the second determination device 9.

In addition apparatus 1 comprises a fourth determination device 11 designed to determine a type of momentary driving maneuver of at least one vehicle if it is determined that the determined expected route deviates from the actual route by at least the predetermined threshold value. To this end the fourth determination device 11 is connected via a signal line 19 with the third determination device 10.

In the shown embodiment the fourth determination device 11 is designed to determine a type of a momentary driving maneuver based on the mobility data as well as additionally on data determined by at least one sensor 3. The sensor 3 is an electromagnetic sensor, such as a radar sensor or a lidar sensor, an acoustic sensor such as an ultra-sound sensor, or an optical camera. To this end the fourth determination device 11 is connected via a signal line 21 with the sensor 3 and via a signal line 20 with the receiving device 7.

In addition apparatus 1 also comprises a classification device 12 designed for the classification of at least the mobility data based on the determined type of momentary driving maneuver. To this end the classification device 12 is connected via a signal line 22 with the fourth determination device 11.

In the embodiment shown the classified mobility data is communicated to least a driver assistance system 5 and/or an infrastructure facility not shown in detail. The driver assistance system 5 is, for example, shaped as a braking assistant or as an intersection assistant. To this end the classification device 12 is connected via a signal line 23 with the driver assistance system 5 and via a signal line 24 with a transmitter device 4. The transmitter device 4 and the receiving device 7 may form a joint transmitting and receiving unit.

Apparatus 1, in the shown embodiment, additionally comprises a computing unit 13 and a computer-readable medium 14, wherein the computer-readable medium 14 has a computer program product stored on it, which when executed on the computing unit 13 instructs the computing unit 13 to execute the steps mentioned in conjunction with the embodiments of the method contemplated herein, in particular the steps of the methods according to FIGS. 1 to 3 by means of the elements mentioned. To this end the computing unit 13 is connected, in a manner not shown in detail, directly or indirectly with the corresponding elements.

FIGS. 6A to 6E show examples of traffic situations, in which the method according to the embodiments contemplated herein, in particular the methods according to embodiments in FIGS. 1 to 3 may be utilized. Components with identical functions are marked with identical reference symbols in the following.

Figure 6A:
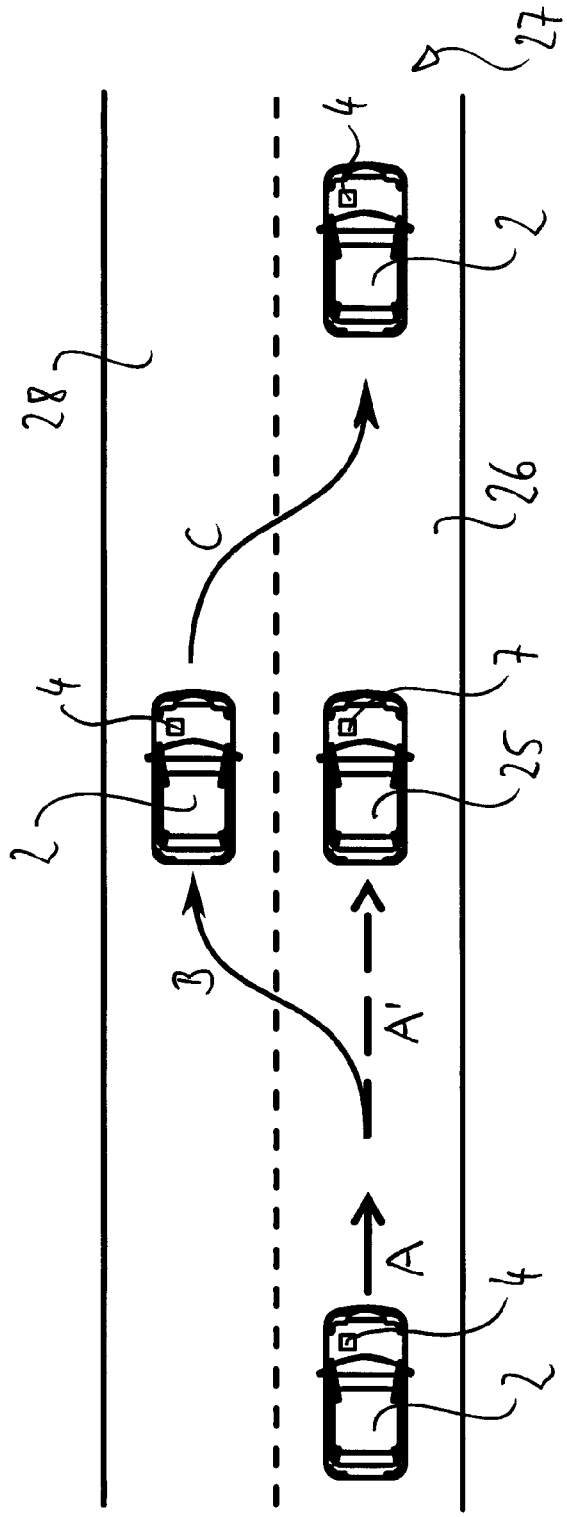
FIGS. 6A to 6E show examples of traffic situations in which the various exemplary embodiments of the method may be used.

FIG. 6A shows three points in time of an overtaking maneuver of a vehicle 2. In the traffic situation illustrated in FIG. 6A the first vehicle 2 drawn as a passenger car in the shown embodiment initially drives in a driving direction along a first lane 26 on a carriage way 27 shown schematically by means of arrow A. In addition to the first lane 26 carriageway 27 comprises a further lane 28. There is a further vehicle 25, which in the embodiment shown is also a passenger car and which drives in front of vehicle 2 in driving direction of the first vehicle 2.

First vehicle 2, by means of a transmitting device 4, communicates vehicle-to-vehicle messages to the second vehicle 25 which are received by vehicle 25 by means of a receiving device 7.

By means of the mobility data contained in the vehicle-to-vehicle message a device not shown in any detail for the classification of data of the second vehicle 25 determines an expected route of the first vehicle 2. If the first vehicle 2 communicates a vehicle-to-vehicle message at the shown first point in time, during which it is still moving linearly along the first lane 26, an expected route is determined which is also aligned along the first lane 26 and is drawn schematically by means of arrow A'.

At the second point in time shown the first vehicle 2 is already driving along a further lane 28 at a level with the second vehicle 25. If at this point in time a further vehicle-to-vehicle message is communicated by the first vehicle 2 to the second vehicle 25, the actual route of the first vehicle 2 is determined from this, based on the mobility data communicated thereby. The actual route is schematically shown in FIG. 6A by means of arrow B.

In the traffic situation shown the determined expected route clearly deviates from the actual route, wherefore a determination of a type of momentary driving maneuver of the first vehicle 2 and a classification of the mobility data is performed based on the determined type of momentary driving maneuver corresponding to a method according to the application. Therefore the determined overtaking maneuver may be used for the classification of the mobility data, thus providing for a further improved method for classification.

Thereafter the first vehicle 2 again changes from the further lane 28 to the first lane 26. This is shown schematically by means of arrow C. At the third point in time shown the first vehicle 2 has completed the overtaking operation and is again driving along the first lane 26.

Figure 6B:
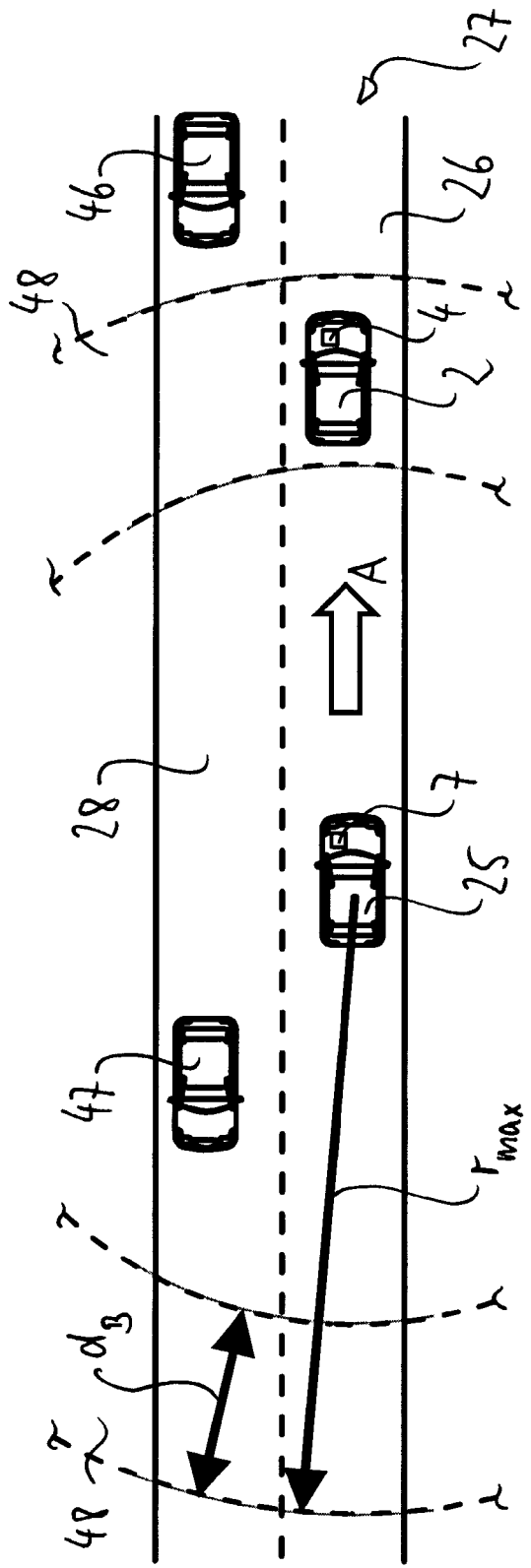

In the traffic situation shown in FIG. 6B a vehicle 25 drives along a first lane 26 of carriageway 27 in a driving direction shown schematically by means of arrow A. As can be seen a further vehicle 2 drives along the first lane 26 in the same direction as vehicle 25. In addition further vehicles 46 and 47 drive along lane 28 of carriageway 27, which runs adjacent to first lane 26.

When the vehicle 25 receives a vehicle-to-vehicle-message from vehicle 2 and it is determined that no message has previously been received from this vehicle 2, it is determined, as to whether the vehicle 2 is within the annular area 48. Area 48 forms a tolerance region resulting from the maximum communication range schematically shown as radius rmax and a bandwidth dB. In the traffic situation shown vehicle 2 is within this area 48. A message received from vehicle 2 is classified as not being erroneous.

Figure 6C:
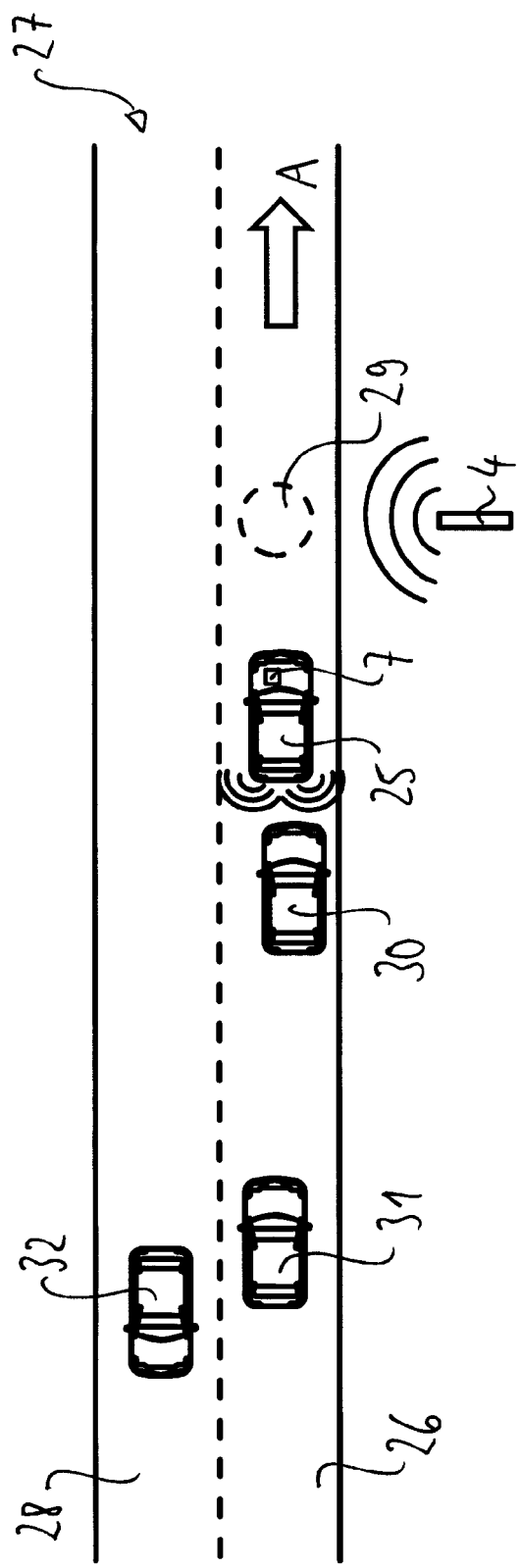

In the traffic situation shown in FIG. 6C a vehicle 25 is driving along a first lane of carriageway 27 in a driving direction schematically shown by arrow A. Carriageway 27 has two lanes, a first lane 26 and a further lane 28. In driving direction of vehicle 25 there are further vehicles 30 and 31 driving behind vehicle 25 along the first lane 26. In addition a vehicle 32 is driving along the second lane 28.

A transmitting device 4 representing a potential attacker is located adjacent to carriageway 27. Transmitting device 4 sends a simulated vehicle-to-vehicle-message at least to vehicle 25. The message, in the shown situation, contains a warning that a fictitious vehicle supposedly driving in a schematically shown area 29 directly in front of vehicle 25 might perform an emergency stop. A falsified message of this kind could significantly affect traffic safety since the vehicle 25 may be tempted to perform a braking or evasive maneuver. By means of the methods contemplated herein messages sent by a potential attacker can be classified as being erroneous, thereby increasing traffic safety.

Figure 6D:
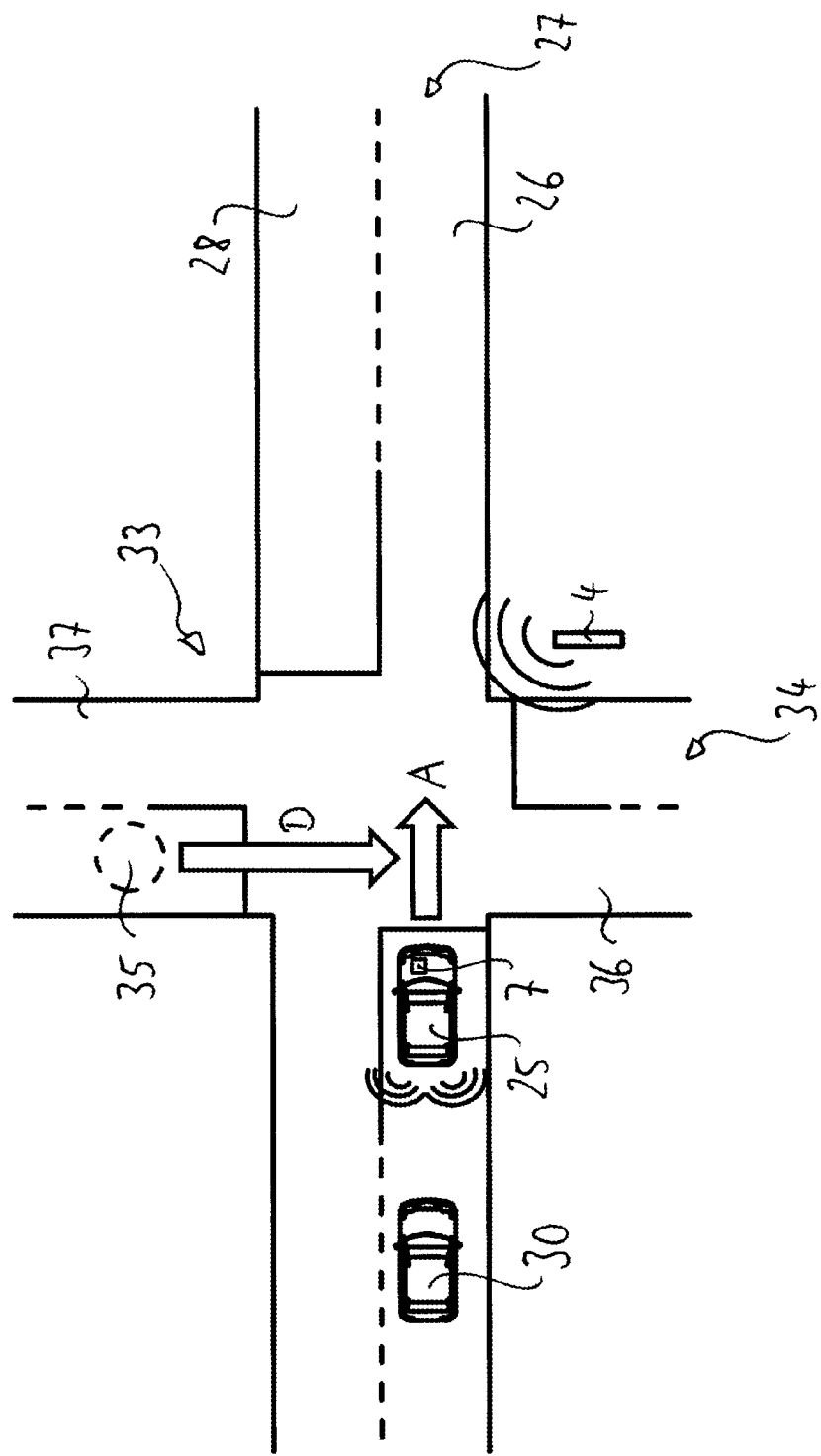

In the traffic situation illustrated in FIG. 6D a vehicle 25 is driving in a driving direction schematically shown by arrow A, along a lane 26 of carriageway 27 while approaching an intersection 33. In driving direction of vehicle 25 there is a further vehicle 30 driving behind it along the first lane 26. A carriageway 34 with lanes 36 and 37 crosses carriageway 27.

A transmitting device 4 arranged adjacently to intersection 33 and representing a possible attacker would, in the situation shown, send a simulated vehicle-to-vehicle-message to at least vehicle 25, which message fakes a vehicle approaching at high speed in a driving direction shown schematically by means of arrow D in an area 35 along lane 36.

Based on these received mobility data an intersection-collision warning could be issued in vehicle 25 and the driver could be tempted to perform a braking or evasive maneuver. By means of the mentioned methods contemplated herein corresponding messages sent by the transmitting device 4 can be classified as being erroneous thereby increasing traffic safety.

Figure 6E:
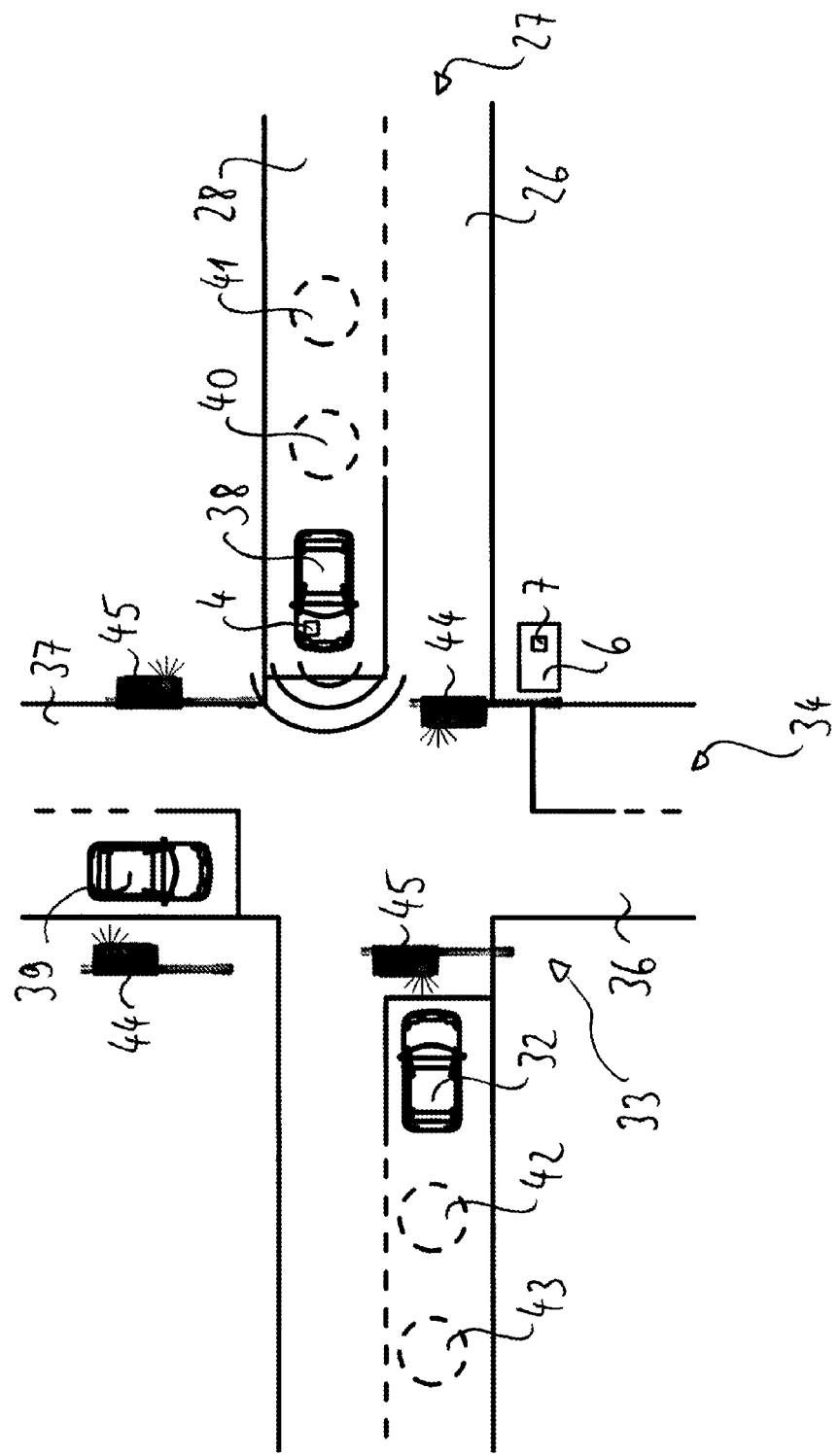

In the traffic situation shown in FIG. 6E a vehicle 32 is driving along a lane 26 of carriageway 27 in front of a traffic light 45. In addition a further vehicle 39 driving along a lane 36 of carriageway 34 crossing carriageway 27 is in front of a traffic light 44 at an intersection 33. Furthermore a vehicle 38 driving along a second lane 28 of carriageway 27 is in front of a further traffic light 45.

By means of a transmitting device 4 vehicle 38 may, in the situation shown, communicate falsified vehicle-to-infrastructure messages to a receiving device 7 of an infrastructure facility 6. The infrastructure facility 6 is connected with traffic lights 44 and 45 of the traffic light system, in order to provide a so-called GLOS function (GLOSA=Green Light Optimum Speed Advisory) by means of which the tailback in front of each traffic light is determined in order to increase the traffic flow in an appropriate manner due to switching the traffic light system on the basis of the vehicle density in each lane. By means of the vehicle-to-infrastructure message vehicle 38 may fake further vehicles in areas 40 and 41 driving along the same lane 28 and in areas 42 and 43 driving along a further lane 27 and thus reduce their waiting time at the traffic light system to the detriment of other traffic participants. By means of the methods according to the application these can be classified as erroneous thereby increasing traffic safety.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for classification of data, the method comprising the steps of:
   receiving, at a first vehicle, a first message from a second vehicle that is a vehicle-to-vehicle message and a vehicle-to-infrastructure message, wherein the first message includes first mobility data of the second vehicle;
   determining, with a computing unit of the first vehicle, an expected route of the second vehicle based on the first mobility data;
   receiving, at the first vehicle, a second message from the second vehicle that is a vehicle-to-vehicle message or a vehicle-to-infrastructure message, wherein the second message includes second mobility data of the second vehicle;

determining, with the computing unit of the first vehicle, an actual route of the second vehicle based on the second mobility data;

determining, with the computing unit of the first vehicle, whether the expected route deviates from the actual route by at least a predetermined threshold value, wherein determining the type of momentary driving maneuver of the second vehicle is performed on a basis of the first mobility data and the second mobility data, and if determined that the expected route deviates from the actual route by at least the predetermined threshold value, determining, with the computing unit of the first vehicle, a type of momentary driving maneuver of the second vehicle and classifying the first mobility data and the second mobility data on a basis of the type of momentary driving maneuver, wherein classifying the first mobility data and the second mobility data comprises the steps of:
adapting the predetermined threshold value to an adapted threshold value based on the type of momentary driving maneuver; and
determining whether the expected route deviates from the actual route by at least the adapted threshold value, and wherein, if it is determined that the expected route deviates from the actual route by at least the adapted threshold value, the first mobility data and the second mobility data are classified as being erroneous, and wherein if it is determined that the expected route does not deviate from the actual route by at least the adapted threshold value, the first mobility data and the second mobility data are classified as being free from errors.

2. The method according to claim 1, wherein determining the type of momentary driving maneuver of the second vehicle is performed on a basis of a Hidden Markov model.

3. The method according to claim 1, wherein determining the type of momentary driving maneuver of the second vehicle is performed on a basis of a Kalman filter method.

4. The method according to claim 1, wherein, if it is determined that the expected route does not deviate from the actual route by at least the adapted threshold value, adaptation of a Kalman Gain value is performed.

5. The method according to claim 1, wherein determining the actual route of the second vehicle and/or determining the type of momentary driving maneuver of the second vehicle is performed additionally on a basis of data determined from a sensor, wherein the sensor is an electromagnetic sensor, an acoustic sensor, or an optical camera.

6. The method according to claim 1, wherein the first message and/or the second message are part of periodically sent messages.

7. The method according to claim 1, wherein at least after receiving the first message a plausibility check on the first mobility data is performed and wherein determining the expected route, determining the actual route and determining whether the expected route deviates from the actual route by at least the predetermined threshold value is performed, if the first mobility data are determined as being plausible.

8. The method according to claim 1, wherein the first message additionally includes an identifier of a transmitting device sending the first message and wherein determining the expected route, determining the actual route and determining whether the expected route deviates from the actual route by at least the predetermined threshold value are performed if a further message has already been received from the transmitting device.

9. The method according to claim 1, wherein the first mobility data and/or the second mobility data, after classifying, are communicated to a driver assistance system and/or an infrastructure facility.

10. A non-transitory computer readable medium embodying a computer program product, the computer program product comprising:
a program to classify data, the program configured to:
receive a first message at a first vehicle that is a vehicle-to-vehicle message and a vehicle-to-infrastructure message from a second vehicle, wherein the first message includes first mobility data of the second vehicle;
determine at the first vehicle an expected route of the second vehicle based on the first mobility data;
receive at the first vehicle a second message that is a vehicle-to-vehicle message or a vehicle-to-infrastructure message, wherein the second message includes second mobility data of the second vehicle;
determine at the first vehicle an actual route of the second vehicle based on the second mobility data;
determine at the first vehicle whether the expected route of the second vehicle deviates from the actual route by at least a predetermined threshold value, and
if determined that the expected route deviates from the actual route by at least the predetermined threshold value, determine a type of momentary driving maneuver of the second vehicle and classifying the first mobility data and the second mobility data on a basis of the type of momentary driving maneuver.

* * * * *